(12) United States Patent
Zeiler

(10) Patent No.: US 12,051,785 B2
(45) Date of Patent: Jul. 30, 2024

(54) BATTERY SYSTEM FOR POWER EQUIPMENT

(71) Applicant: Briggs & Stratton, LLC, Wauwatosa, WI (US)

(72) Inventor: Jeffrey Zeiler, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 589 days.

(21) Appl. No.: 17/284,205

(22) PCT Filed: Oct. 10, 2019

(86) PCT No.: PCT/US2019/055519
§ 371 (c)(1),
(2) Date: Apr. 9, 2021

(87) PCT Pub. No.: WO2020/077035
PCT Pub. Date: Apr. 16, 2020

(65) Prior Publication Data
US 2021/0344052 A1 Nov. 4, 2021

Related U.S. Application Data

(60) Provisional application No. 62/745,045, filed on Oct. 12, 2018.

(51) Int. Cl.
*H01M 10/42* (2006.01)
*H01M 50/244* (2021.01)
*H01M 50/296* (2021.01)

(52) U.S. Cl.
CPC ....... *H01M 10/425* (2013.01); *H01M 50/244* (2021.01); *H01M 50/296* (2021.01); *H01M 2010/4271* (2013.01)

(58) Field of Classification Search
None
See application file for complete search history.

(56) References Cited

U.S. PATENT DOCUMENTS

| | | | |
|---|---|---|---|
| 8,471,532 B2 * | 6/2013 | Johnson | H02J 7/00309 320/120 |
| 9,825,475 B2 | 11/2017 | Smith et al. | |
| 2008/0037779 A1 * | 2/2008 | Seman, Jr. | H02J 7/00047 380/46 |

OTHER PUBLICATIONS

International Search Report and Written Opinion for International Application No. PCT/US2019/055519 mailing date Jan. 9, 2020, 10 pages.

* cited by examiner

*Primary Examiner* — Wyatt P McConnell
(74) *Attorney, Agent, or Firm* — Foley & Lardner LLP

(57) ABSTRACT

A battery system for power equipment includes a battery configured to removably connect to a receptacle, and a processing circuit of the battery configured to communicably interface with a processing circuit of the receptacle, wherein the battery and the receptacle are configured to electrically connect and transfer power from the battery through the receptacle to the power equipment, wherein the processing circuits of the battery and the receptacle are configured to transfer information between the battery and the receptacle, and wherein the processing circuits of the battery and the receptacle are configured to allow the transfer of power from the battery through the receptacle to the power equipment based on the information transferred between the battery and the receptacle.

16 Claims, 15 Drawing Sheets

BATTERY SYSTEM FOR POWER EQUIPMENT

CROSS-REFERENCE TO RELATED PATENT APPLICATIONS

This application is a National Phase Application of PCT/US2019/055519 filed Oct. 10, 2019 which claims the benefit of U.S. Provisional Application No. 62/745,045, filed Oct. 12, 2018, both of which are incorporated herein by reference in their entireties.

BACKGROUND

The present disclosure relates generally to battery packs. More specifically, the present disclosure relates to battery systems used to power motors on power tools or other power equipment. Battery packs are often used in the field of power equipment to power motors on power tools or to power other equipment. Typically, the battery fits into a receptacle portion of the power tool and provides power to the motor through terminals on the battery.

SUMMARY

One embodiment of an invention relates to a battery system for power equipment that includes a battery configured to removably connect to a receptacle, and a processing circuit of the battery configured to communicably interface with a processing circuit of the receptacle, wherein the battery and the receptacle are configured to electrically connect and transfer power from the battery through the receptacle to the power equipment, wherein the processing circuits of the battery and the receptacle are configured to transfer information between the battery and the receptacle, and wherein the processing circuits of the battery and the receptacle are configured to allow the transfer of power from the battery through the receptacle to the power equipment based on the information transferred between the battery and the receptacle.

Another embodiment of an invention relates to a receptacle assembly for power equipment that includes multiple terminals configured to connect to the terminals of a battery, and a processing circuit configured to communicate with a processing circuit of the battery, wherein the processing circuit is further configured to enable the battery to transfer power from the battery to the receptacle upon a receipt of information from the processing circuit of the battery to allow the battery to transfer power from the battery to the receptacle Another embodiment of an invention relates to a method for connecting a battery to a receptacle, where the method includes removably connecting the battery to the receptacle, wherein the battery and the receptacle are electrically and communicably connected, transferring information between a processing circuit of the battery and a processing circuit of the receptacle, and transferring power from the battery to the receptacle based on the transfer of information between the processing circuit of the battery and the processing circuit of the receptacle.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, a battery and a receptacle are shown according to some embodiments. The battery is configured to removably attach to the receptacle via guide rails in some embodiments. In some embodiments, the battery electrically connects to the receptacle to transfer power from the battery to the receptacle. The battery may be an 82 volt battery or may have different voltage ratings. The battery may have a short prevention circuit, according to some embodiments. In some embodiments, the battery is configured to detect if it is inserted in the receptacle. In some embodiments, the receptacle is configured to detect that the battery has been inserted into it. If the battery detects that it is not in the receptacle, it does not allow full power through its terminals. If the battery detects that it is in the receptacle or if the receptacle detects that the battery has been inserted and sends a command to the battery, the battery allows full power through the terminals. In some embodiments, the battery communicates with the receptacle to determine if it should allow full power through its terminals. This communication between the battery and the receptacle to determine that the battery may output power to the receptacle may be referred to as "digital handshaking." This "digital handshaking" may help ensure that only authorized batteries are allowed to provide electricity to an end product (e.g., power equipment or a power tool) through the receptacle. In some embodiments, the receptacle and the battery include an interface and a circuit configured to connect the battery and the receptacle and to allow the battery to output full power to the receptacle.

Figure 1:
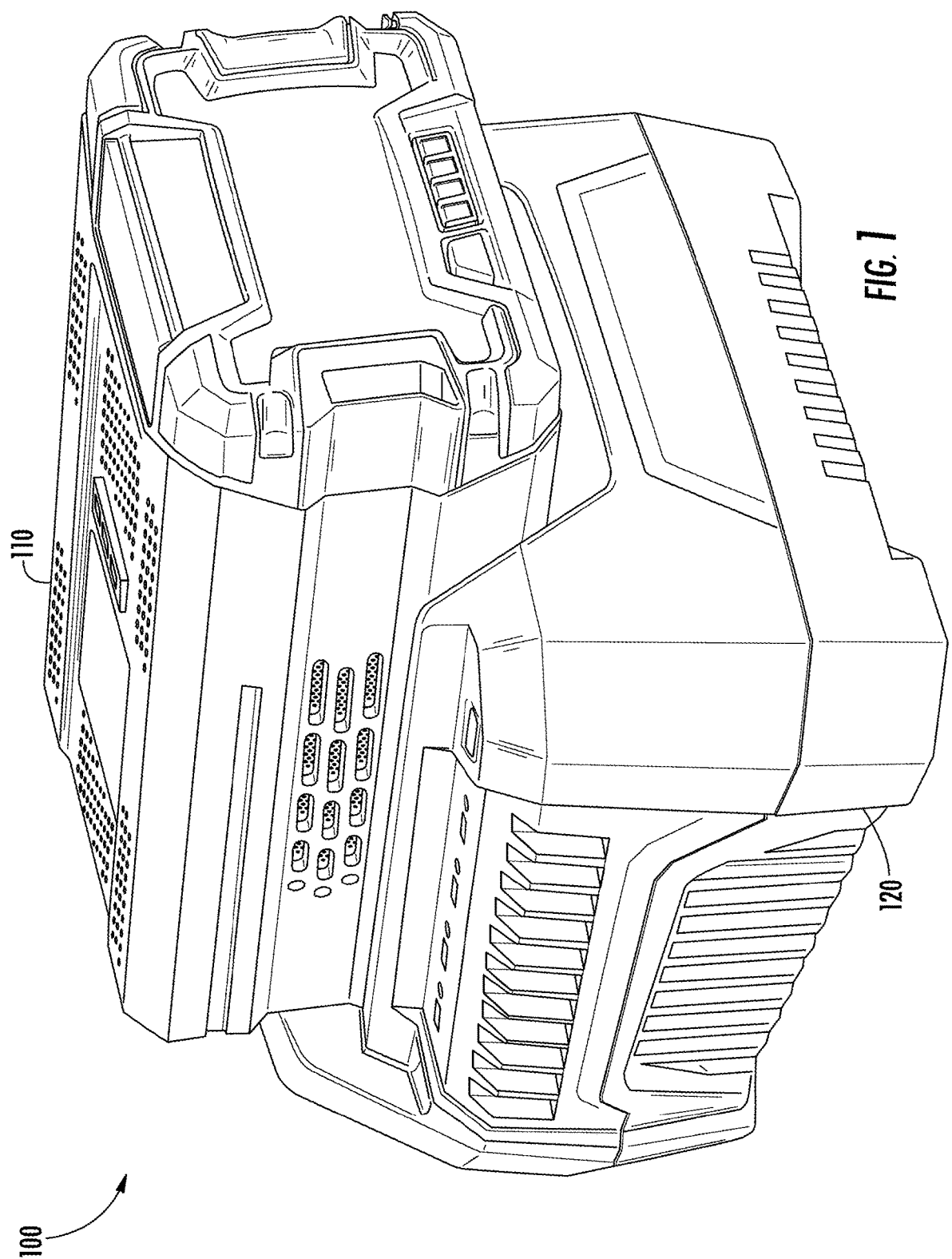
FIG. 1 is a front perspective view of a battery and receptacle assembly, according to an exemplary embodiment.
Figure 2:
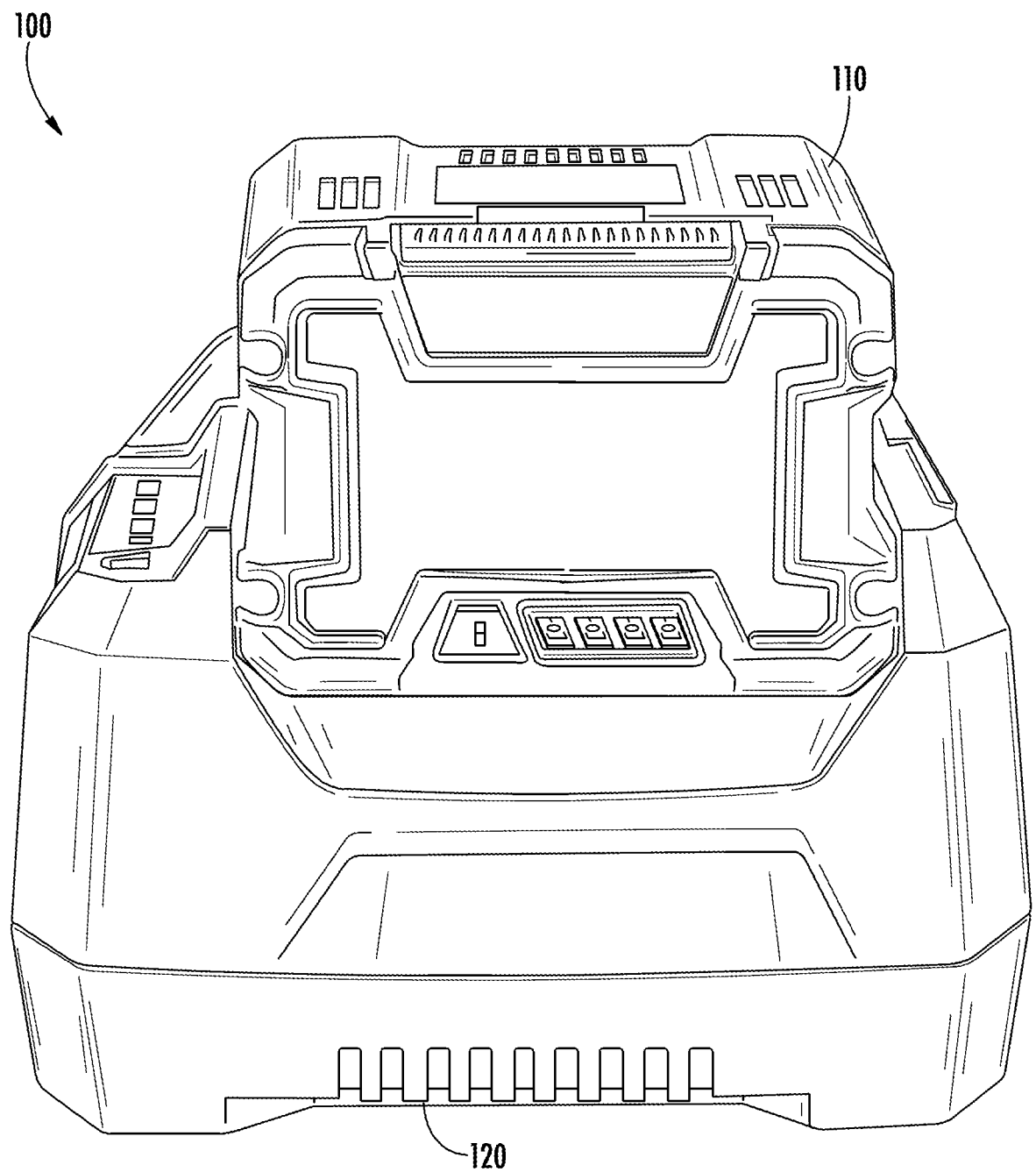
FIG. 2 is a front view of the battery and receptacle assembly of FIG. 1.
Figure 3:
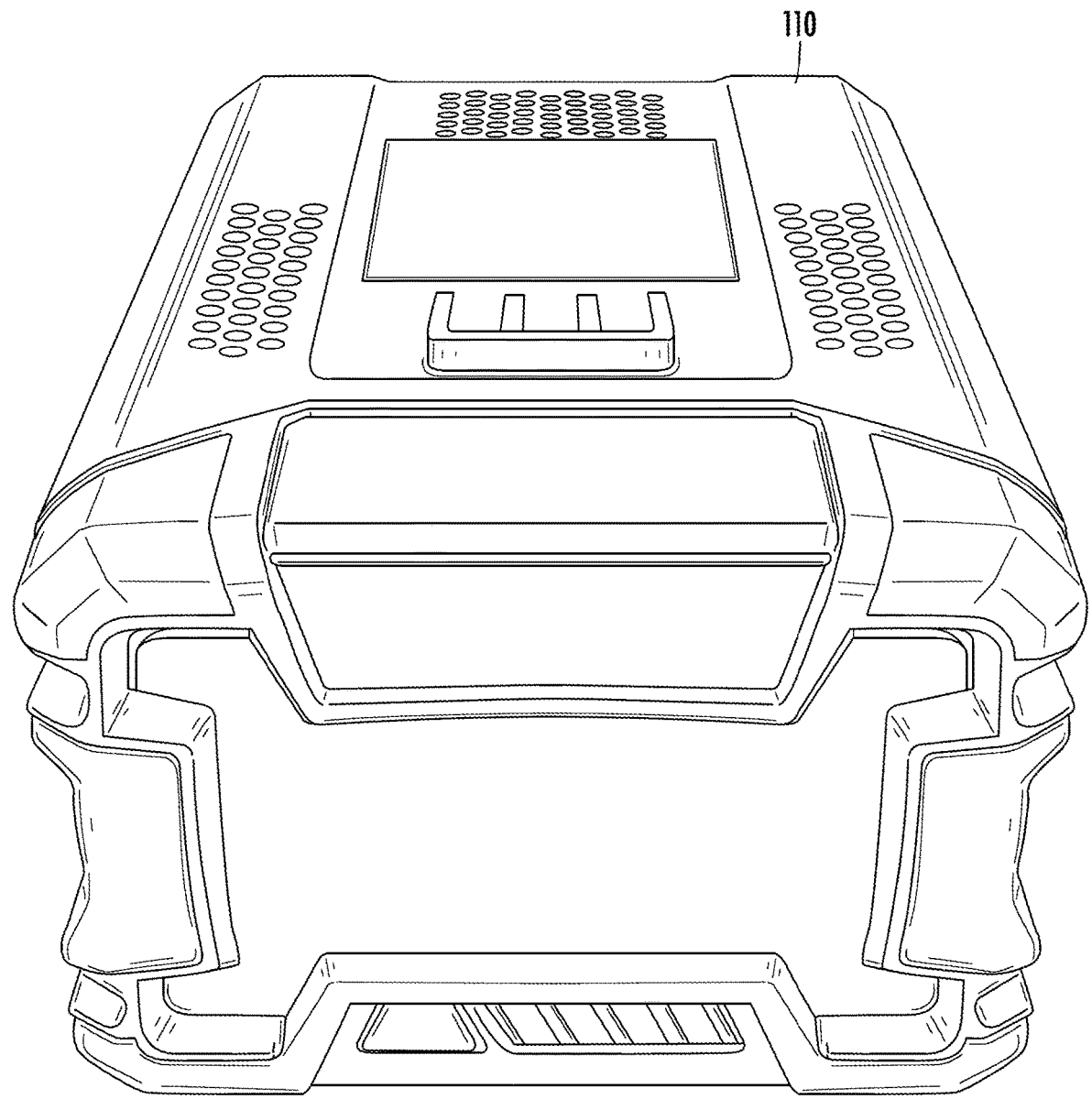
FIG. 3 is a front perspective view of the battery of FIG. 1.
Figure 4:
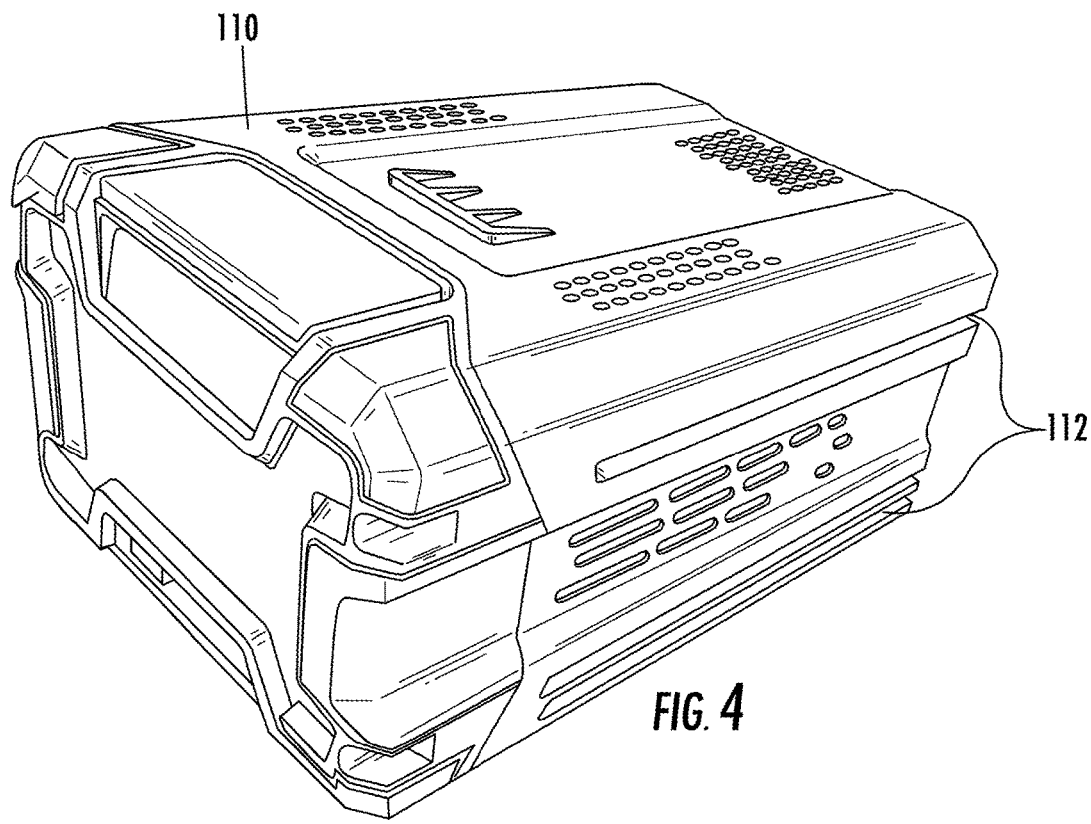
FIG. 4 is a front perspective view of the battery of FIG. 1.
Figure 5:
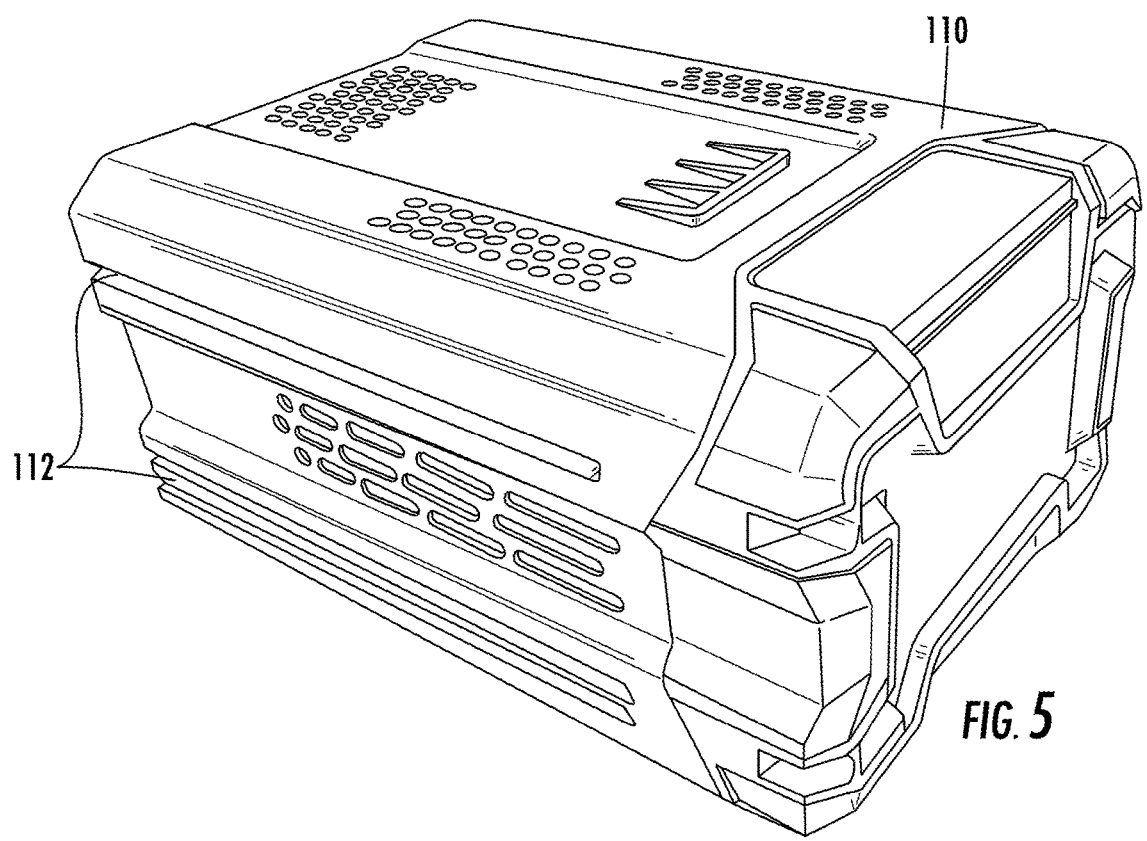
FIG. 5 is a front perspective view of the battery of FIG. 1.
Figure 6:
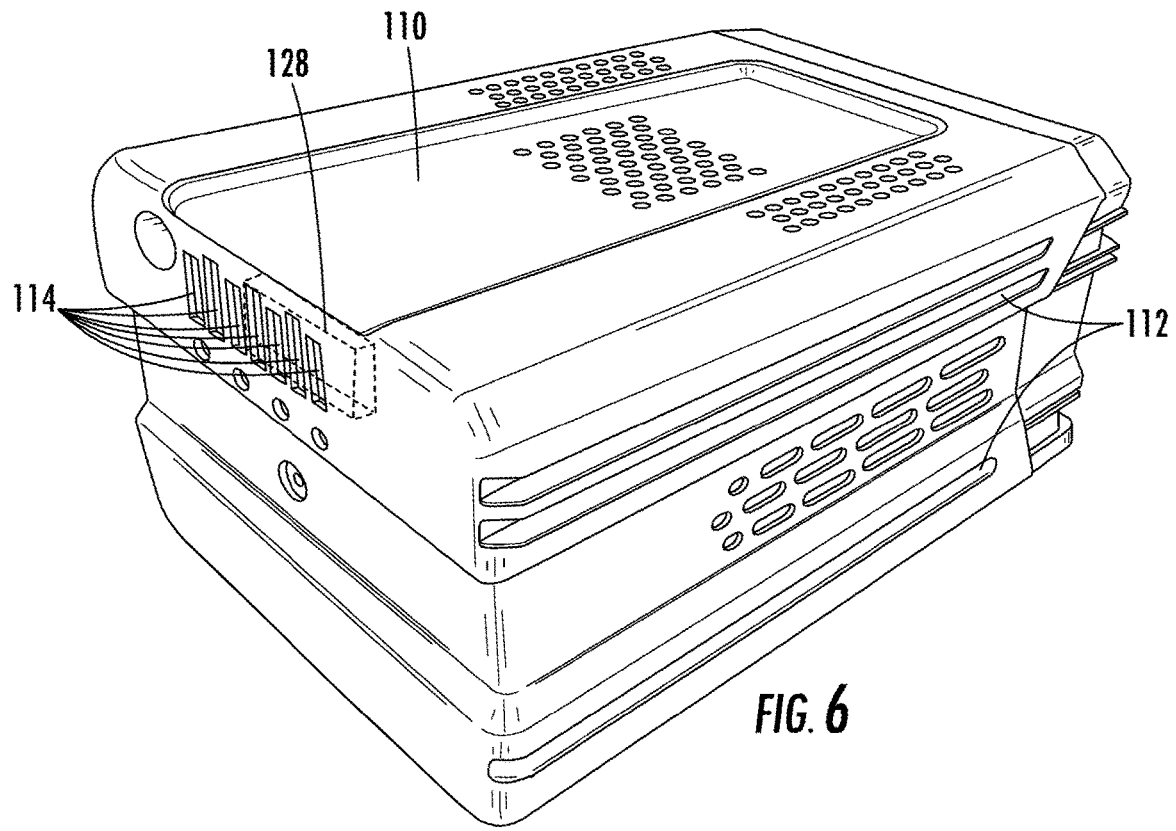
FIG. 6 is a rear perspective view of the battery of FIG. 1.
Figure 7:
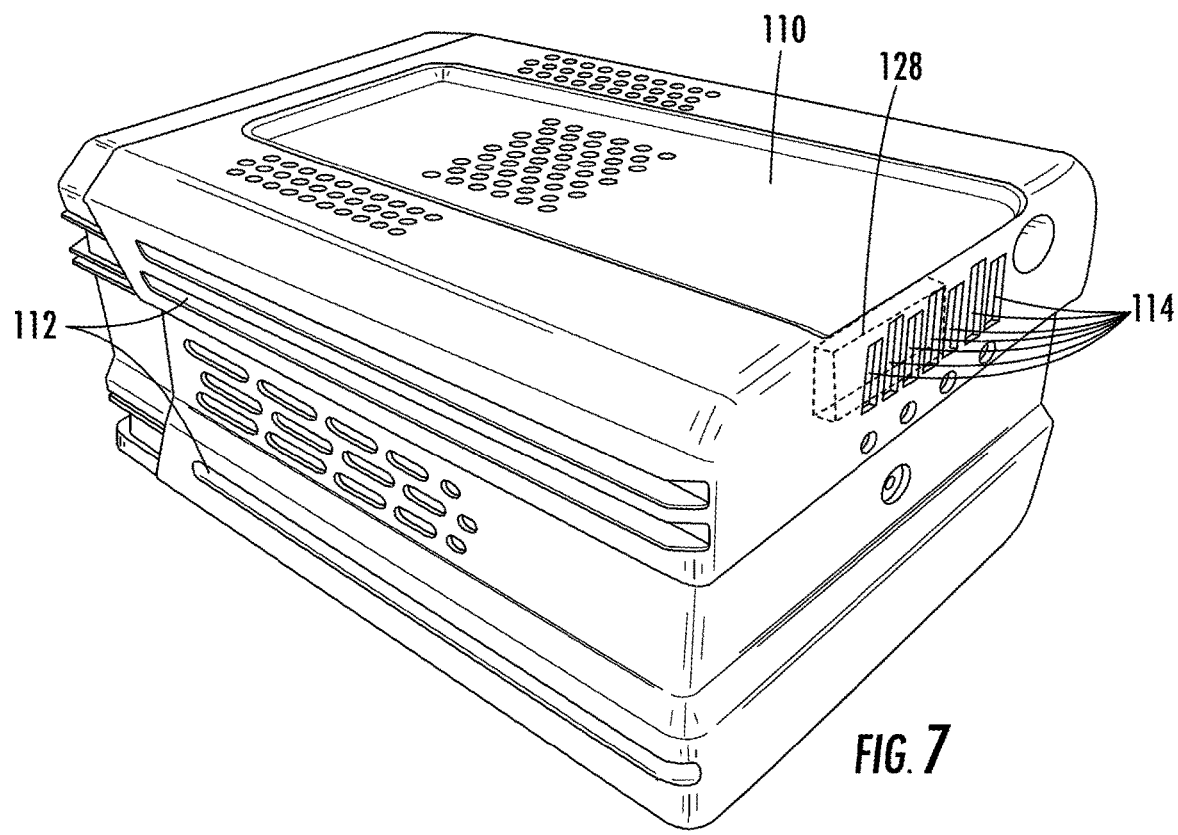
FIG. 7 is a rear perspective view of the battery of FIG. 1.

Referring now to FIGS. 1-2, a battery assembly 100 is shown. The battery assembly 100 includes a battery 110 and a receptacle 120. The battery 110 may be an 82 volt battery according to some embodiments. In some embodiments, the battery 110 is a 60 volt battery, a 52 volt battery, a 48 volt battery, a 24 volt battery, a 12 volt battery, etc., or a battery with any other voltage. The battery 110 may be a lithium-ion battery (Li-ion) in some embodiments. In some embodiments, the battery 110 may be a nickel cadmium battery (NiCd), a nickel-metal hydride battery (NiMH), a lithium ion polymer battery (Li-ion polymer), etc., or any other type of battery that can be used to store energy. The receptacle 120 may be configured to removably connect to the battery 110. In some embodiments, the receptacle 120 is integrally formed with power equipment. For example, the receptacle 120 may be integrally formed with the housing of a lawnmower, a sump pump, a table saw, a concrete cutter, a hydraulic pump, a floor cleaner, a floor polisher, a hand-held power tool, etc., or any other power equipment. These applications typically require a high powered motor with large amounts of torque output. Such a motor requires a high voltage battery in order to be supplied with power and to operate. When dealing with large batteries with high voltages, it is possible that the batteries can short if a conductive object is placed across the positive and negative terminals of the battery. In some embodiments, receptacle 120 may be integrally formed with the housing of a lawnmower, for example. Receptacle 120 may be configured to receive battery 110 and may be positioned directly above a motor of the lawnmower, or partially rearward of the motor. In some embodiments, receptacle 120 may be configured to deliver power from the battery 110 to a motor of the lawnmower configured to drive blades of the lawnmower. In some embodiments, receptacle 120 may be integrally formed with the housing of the power equipment and may be configured to power a motor of the power equipment. In some embodiments, receptacle 120 may be configured to supply power from the battery 110 to a motor configured to start an internal combustion engine on the power equipment. In some embodiments, the receptacle 120 is not integrally formed with the housing of the power equipment, but is rather removably attached to the power equipment and configured to deliver power from the battery 110 to the power equipment. For example, the receptacle 120 may be attached to a leg of the table saw and may be configured to deliver power from the battery 110 to the table saw motor.

Figure 8:
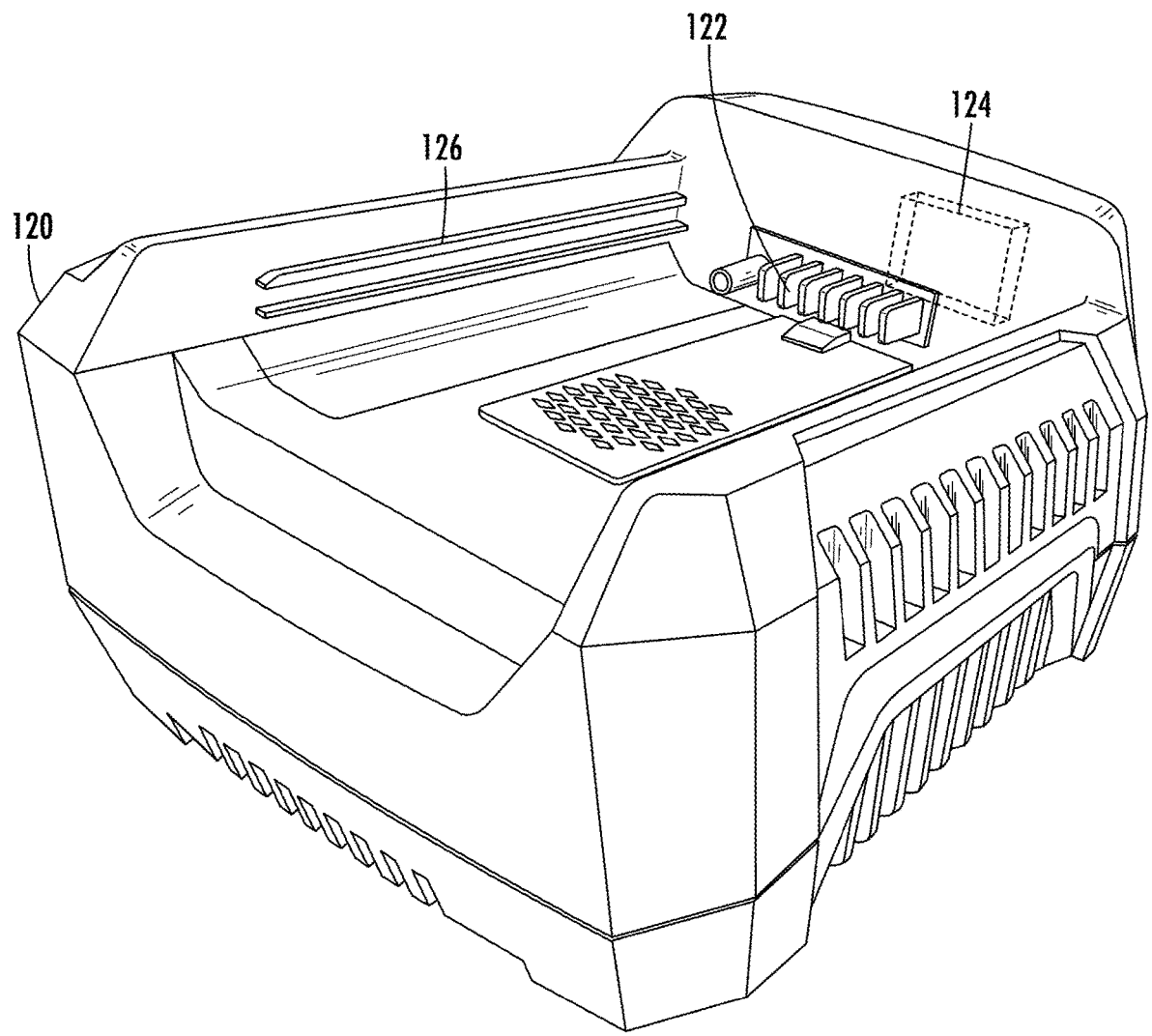
FIG. 8 is a front perspective view of the receptacle of FIG. 1.
Figure 9:
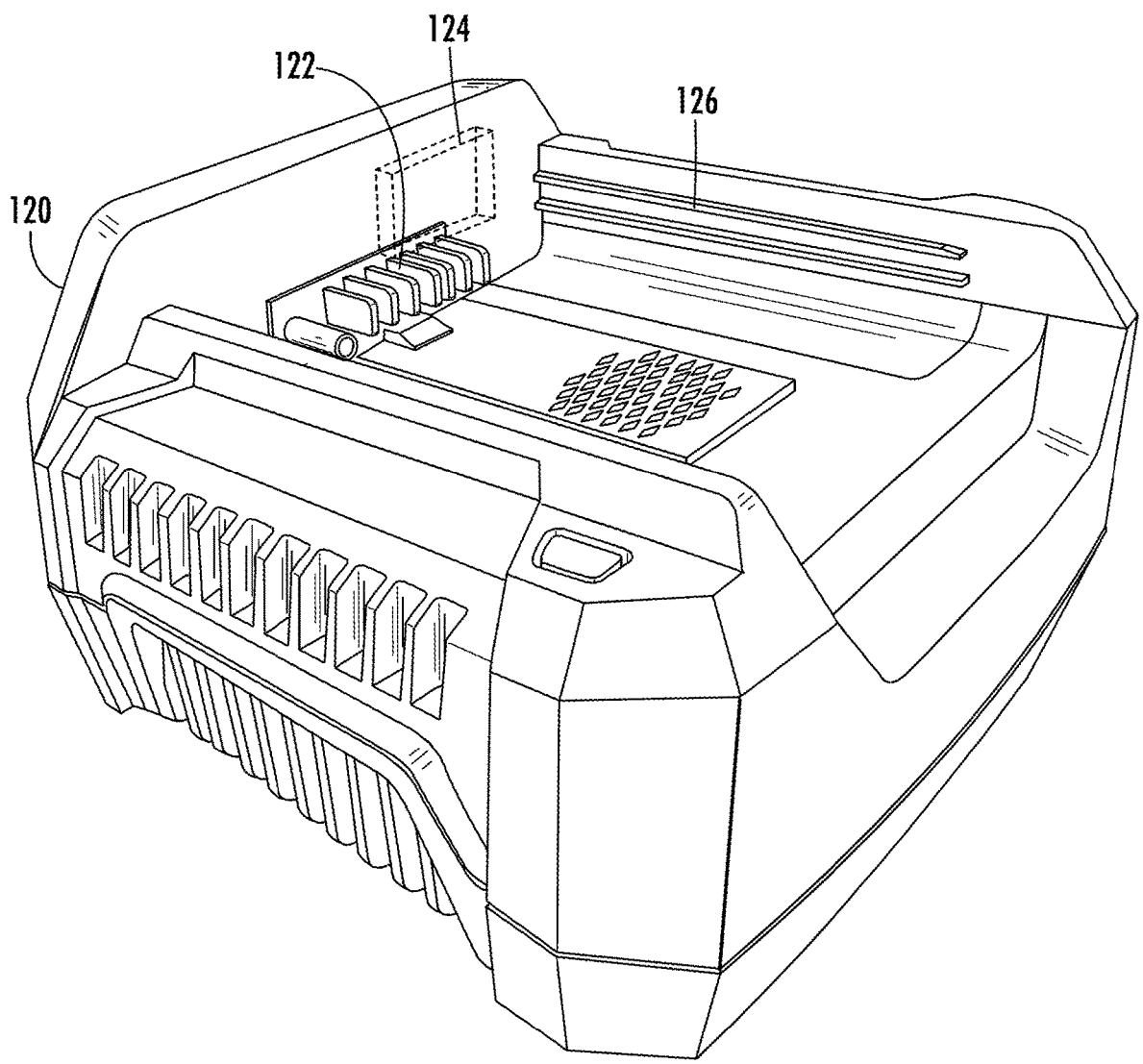
FIG. 9 is a front perspective view of the receptacle of FIG. 1.
Figure 10:
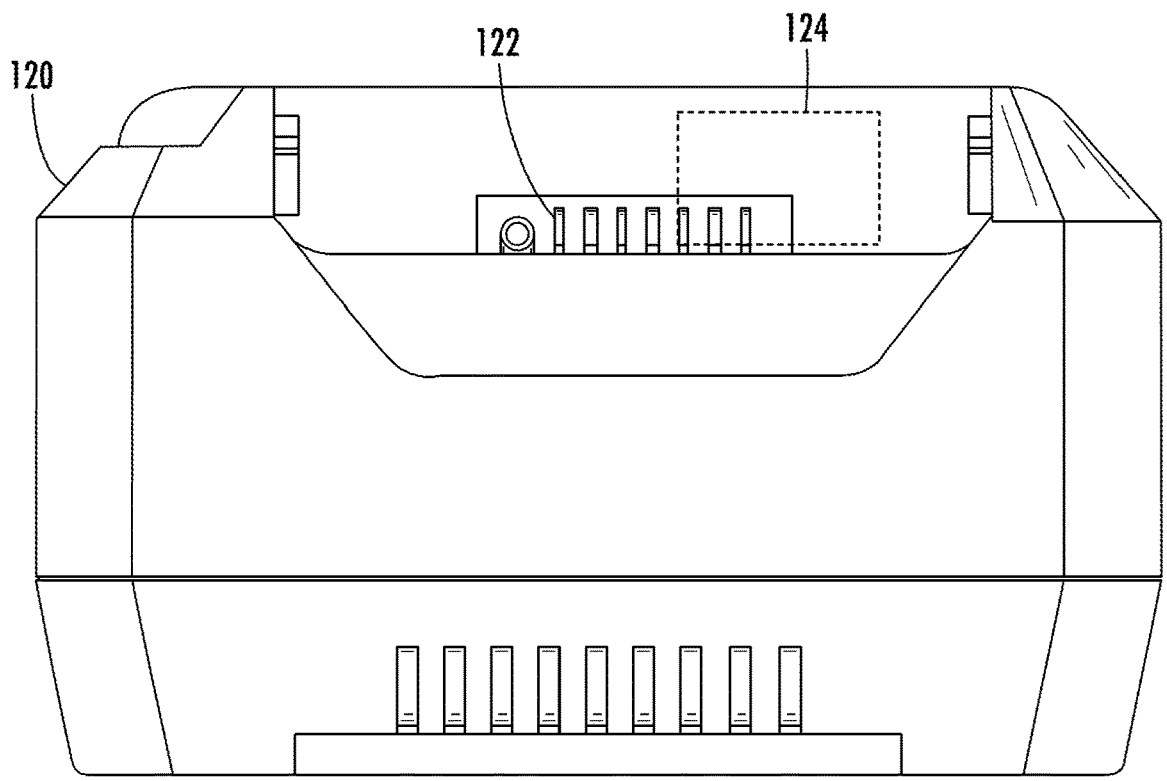
FIG. 10 is a front view of the receptacle of FIG. 1.
Figure 11:
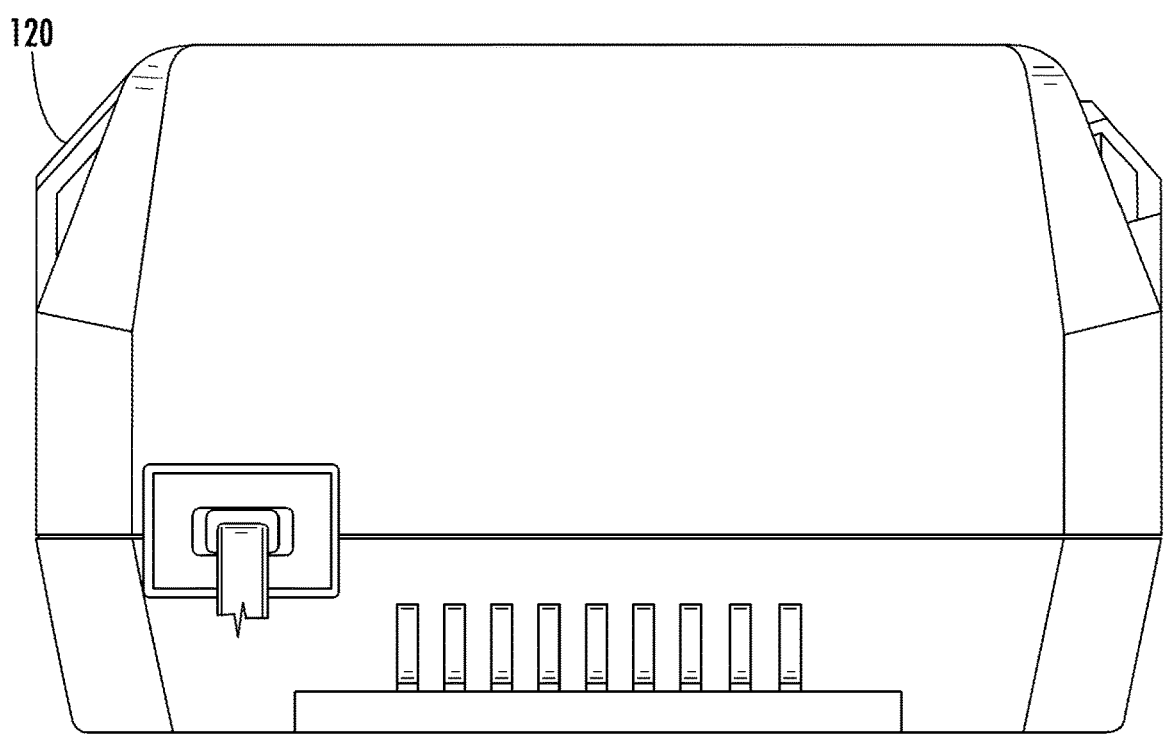
FIG. 11 is a front view of the receptacle of FIG. 1.
Figure 12:
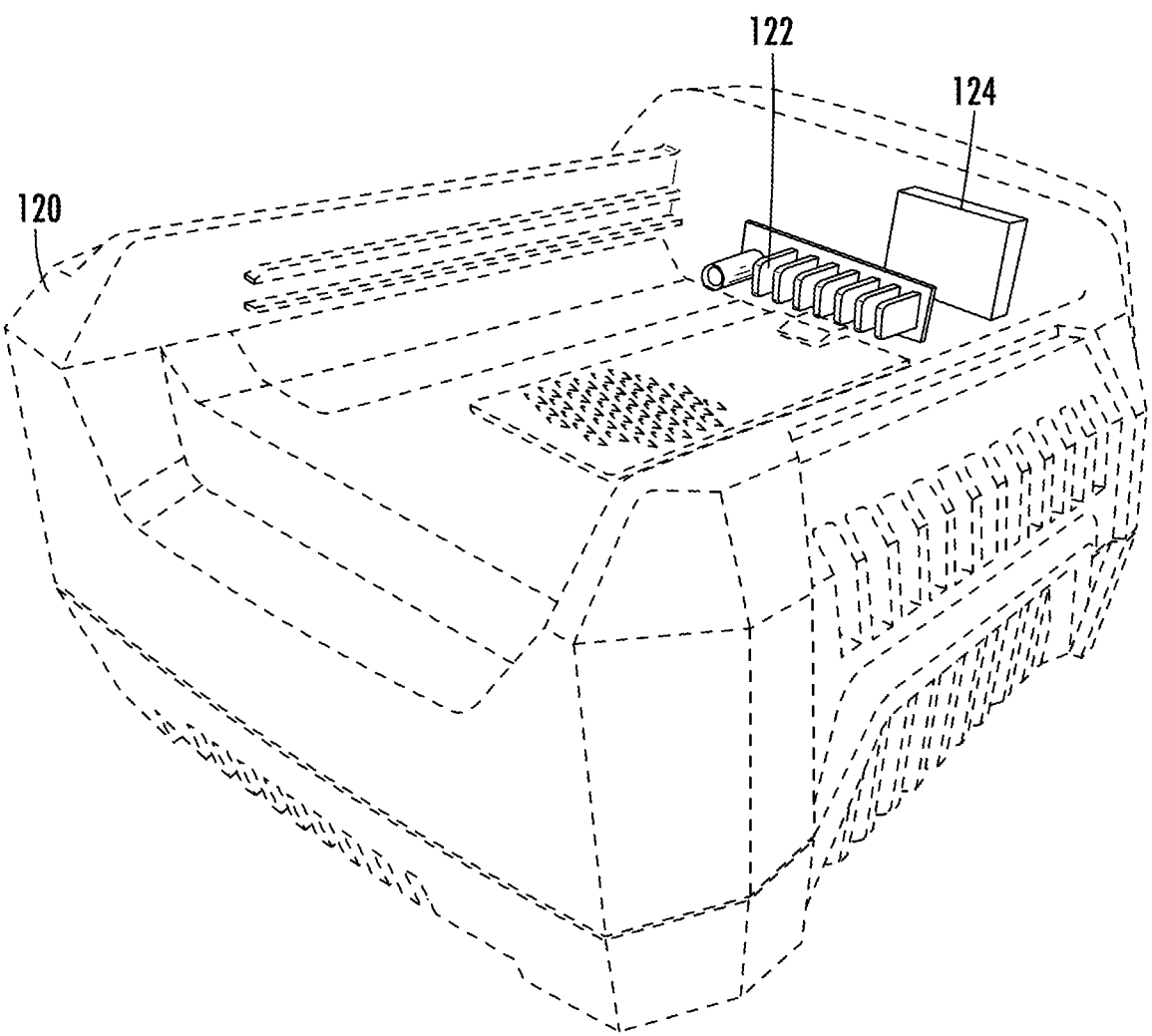
FIG. 12 is a front perspective view of the receptacle of FIG. 1.

Referring now to FIGS. 3-7, the battery 110 is shown according to some embodiments. The battery 110 may be a lithium-ion battery according to some embodiments. Battery 110 may include channels 112. Channels 112 may be configured to interface with guide rails 126 (see FIGS. 8-9). Guide rails 126 and channels 112 may be configured to removably connect battery 110 and receptacle 120, according to some embodiments. In some embodiments, channels 112 and guide rails 126 guide the battery 110 into proper electrical connection with receptacle 120. Battery 110 is also shown to include female terminals 114. Battery 110 may have any number of female terminals 114, including but not limited to positive and negative terminals which may transfer power to the equipment through the receptacle 120. Female terminals 114 may be configured to electrically interface with male terminals 122 of receptacle 120 (see FIGS. 8-9). In some embodiments, battery 110 has male terminals instead of female terminals 114. In some embodiments, channels 112 are configured to properly connect the female terminals 114 of battery 110 to male terminals 122 of receptacle 120. In some embodiments, the terminals 114 on battery 110 may be male or female terminals.

Still referring to FIGS. 3-7, battery 110 is shown to include electronic controller 128. Electronic controller 128 may be connected to one or more of the terminals 114 according to some embodiments. In some embodiments, electronic controller 128 is a circuit or a processor. Electronic controller 128 is configured to interface with at least one of the terminals 114 to determine if the battery 110 has been connected to receptacle 120. Electronic controller 128 may receive information from one of the terminals 114, process the information to determine that the battery 110 has been connected to the receptacle 120, and allow the battery 110 to output full power. As discussed above, this communication between the battery 110 and the receptacle 120 may be referred to as "digital handshaking." Advantageously, this provides a safety feature so that the battery 110 cannot be accidentally shorted out by a metal object across the positive and negative terminals when it is not attached to receptacle 120. Additionally, the battery 110 may only work with receptacles 120 that can communicate with it appropriately. Therefore, the manufacturer of the battery 110 can ensure that the battery will not be used with other companies' equipment or with other companies' receptacles and can allow other companies to use its batteries by providing the other companies with verification circuit 124. Advantageously, this gives the battery manufacturer the ability to control the use of their batteries and to ensure that the battery 110 will not be used in a receptacle 120 that it is not suited for.

Referring now to FIGS. 8-11, the receptacle 120 is shown, according to some embodiments. The receptacle 120 is shown to include guide rails 126 according to some embodiments. In some embodiments, the guide rails 126 are configured to interface with the channels 112 of the battery 110 to removably connect the battery 110 and the receptacle 120. In some embodiments, receptacle 120 includes a latch configured to removably connect the battery 110 to the receptacle 120.

Still referring to FIGS. 8-11, receptacle 120 is shown to include male terminals 122 according to some embodiments. In some embodiments, the terminals of the receptacle are female terminals 114. In some embodiments, male terminals 122 are configured to interface with female terminals 114 of battery 110. In some embodiments, receptacle 120 includes verification circuit 124. Verification circuit 124 may connect to one of the male terminals 122 and connect to one of the female terminals 114 of the battery 110 according to some embodiments. When the battery 110 is connected to the receptacle 120, the verification circuit 124 and the electronic controller 128 may communicate with each other. Verification circuit 124 may provide the battery 110 with information that indicates that the battery 110 has been connected to the receptacle 120 and that the battery 110 can output full power to the receptacle 120.

In some embodiments, the verification circuit 124 is a circuit board, configured to communicate with electronic controller 128 of the battery 110. Electronic controller 128 may also be a circuit board, configured to communicate with verification circuit 124 of the receptacle 120 according to some embodiments. Both the verification circuit 124 and the electronic controller 128 may be a printed circuit board including a processor, a memory, a communications interface, etc. Both the verification circuit 124 and the electronic controller 128 may include random access memory, read only memory, dynamic random access memory, etc., or any other types of memory. In some embodiments, both electronic controller 128 and verification circuit 124 are microcontrollers which may include a central processing unit, random access memory, read only memory, input/output ports, timers and counters, analog to digital and digital to analog converters, serial interfacing ports, etc. In some embodiments, electronic controller 128 is also configured to control the output power across the terminals 114 of the battery 110.

The communication between verification circuit 124 of the receptacle and electronic controller 128 of the battery 110 may be analog or digital according to some embodiments. In some embodiments, the verification circuit 124 may have a resistor with a particular value. The battery 110 may be configured to apply a current from a particular voltage across the resistor of the verification circuit 124 to determine the resistance of the resistor. If electronic controller 128 determines that the resistance is a particular value (e.g., 2 ohms), the electronic controller 128 may output full power to the receptacle 120. In some embodiments, battery 110 may include the resistor with the particular value and the receptacle 120 may verify its connection to the battery 110 by determining the value of the resistor and determining that it is the particular value. The receptacle 120 may then send a command to the battery 110 to output full power from the battery 110 to the receptacle 120.

In some embodiments, the communication between the verification circuit 124 of the receptacle 120 and electronic controller 128 of the battery 110 may be digital. The verification circuit 124 may communicate with the electronic controller 128 of the battery 110 and verify that the battery 110 has been properly connected to the receptacle 120 and that the battery 110 may output full power across the female terminals 114. In some embodiments, the communication between the verification circuit 124 of the receptacle 120 and the electronic controller 128 of the battery 110 may be a serial communication. In some embodiments, the verification circuit 124 of the receptacle 120 and the electronic controller 128 of the battery 110 are both processing circuits, each including a computer bus configured to communicate with each other via serial communication. The verification circuit 124 and electronic controller 128 may communicate via SPI (serial peripheral interface), I2C (inter-integrated circuit), USB (universal serial bus), etc., or any other serial communications protocol. In some embodiments, the verification circuit 124 of the receptacle 120 may send a request to the electronic controller 128 of the battery 110 and the electronic controller 128 may return a value to the verification circuit 124 of the receptacle 120. In some embodiments, the value is a password, a number, or any other information that indicates that the battery 110 is connected to the receptacle 120 and may output power to the receptacle 120. In some embodiments, the password, number, or information that indicates that the battery 110 is connected to the receptacle 120 is proprietary to a manufacturer of battery 110. This proprietary "handshaking" information may help ensure that only authorized batteries 110 and receptacles 120 are used in combination with each other according to some embodiments. In some embodiments, the electronic controller 128 of the battery 110 may communicate information regarding the battery 110 properties (e.g., voltage, serial number, etc.), which indicates that the battery 110 is appropriate for the receptacle 120. In some embodiments, the verification circuit 124 of the receptacle 120 is configured to receive the information regarding the battery 110 properties and return a command to the battery 110 to output power to the receptacle 120. In some embodiments, the information transferred between the verification circuit 124 of the receptacle 120 and the electronic controller 128 of the battery 110 may be encrypted. In some embodiments, the verification circuit 124 and the electronic controller 128 are configured to decrypt and encrypt information received and transferred between the verification circuit 124 and the electronic controller 128. In some embodiments, the encryption of the information transferred between verification circuit 124 and electronic controller 128 may be AES (advanced encryption standard), 3DES (triple data encryption standard), Twofish, RSA, or any other data encryption standard. Both electronic controller 128 of the battery 110 and verification circuit 124 of the receptacle 120 may have a key necessary to encrypt and decrypt information transmitted between electronic controller 128 and verification circuit 124. In some embodiments, the verification circuit 124 sends a command to the electronic controller 128 to allow full power to be transferred from the battery 110 to the receptacle 120. The command may be encrypted and require the key to decrypt the command. Electronic controller 128 of the battery 110 may decrypt the command using the key and then process and perform the command or electronic controller 128 may process the command and perform an operation based on the command. If the battery 110 does not know the encryption/decryption key, or if the battery 110 is not equipped with electronic controller 128 configured to decrypt and perform the command from the verification circuit 124, the battery 110 will not be able to process the command from the verification circuit 124 and will not output power to the equipment through the receptacle 120. If the receptacle 120 does not include the verification circuit 124, and the battery 110 includes electronic controller 128, the battery 110 will not output full power to the receptacle 120. In some embodiments, the receptacle 120 may be configured to prevent power transfer from the battery 110 to the equipment if the battery 110 does not include electronic controller 128. For example, if a battery from another company is used which does not have verification circuit 124, and is connected to receptacle 120, receptacle 120 may not allow the power to be transferred from the battery to the equipment. In some embodiments, receptacle 120 does not allow the power to transfer from the battery to the equipment if the verification circuit 124 of the receptacle 120 does not receive information from the battery indicating that the battery is the correct voltage, brand, power output, etc. In some embodiments, the receptacle 120 may be configured to allow batteries from other manufacturers to be connected and to power the equipment with which the receptacle 120 is used. In some embodiments, the battery 110 may be configured to output maximum power only when it is connected to a receptacle which includes verification circuit 124.

In some embodiments, battery 110 may be configured to be in a "locked" mode when it is disconnected from the receptacle 120. When the battery 110 is in the "locked" mode, it may be configured to prevent maximum power output through the positive and negative terminals. In some embodiments, battery 110 may be configured to allow up to a small amount of current to be output from the terminals so that the voltage of the battery 110 can be measured with a multi-meter. In some embodiments, the "locked" mode ensures that the battery will not short out if a conductive object is placed across the positive and negative terminals of the battery 110. In some embodiments, the battery 110 includes a fuse configured to break if a current output greater than a threshold value is drawn from the battery 110. In some embodiments, the communication between the battery 110 and the receptacle 120 causes the battery 110 to transfer into an "unlocked" mode. In some embodiments, the battery 110 may only be unlocked when it has communicated with the verification circuit 124 of the receptacle 120 and is connected to the receptacle 120. When the battery 110 is in the "unlocked" mode, it may allow maximum power output through the terminals 114. The power output from the battery 110 may be transferred through the receptacle 120 to the motor of the power equipment. In some embodiments, when the battery 110 is removed from the receptacle 120, it defaults back to the "locked" mode. In some embodiments, the electronic controller 128 of the battery 110 is powered by the battery 110. In some embodiments, the verification circuit 124 of the receptacle 120 is powered by the battery 110. In some embodiments, the verification circuit 124 of the receptacle 120 and the electronic controller 128 of the battery 110 may each include their own battery and may receive power from their own batteries. Electronic controller 128 of the battery 110 may be configured to detect that battery 110 is connected to the receptacle 120 and allow a power output from the battery 110 sufficient to power the verification circuit 124 of the receptacle 120. The electronic controller 128 of the battery 110 and the verification circuit 124 of the receptacle may then be allowed to communicate as described above to verify that the battery 110 and the receptacle 120 may be used with each other and that the battery 110 may transfer power through the receptacle to the equipment.

In some embodiments, the connection between the verification circuit 124 of the receptacle 120 and the electronic controller 128 of the battery 110 may be a wired connection. For example, one or more of the terminals 114 of the battery 110 and one or more of the terminals 122 of the receptacle 120 may be configured to communicably connect the electronic controller 128 of the battery 110 to the verification circuit 124 of the receptacle 120. In some embodiments, the connection between the verification circuit 124 of the receptacle 120 and the electronic controller 128 of the battery 110 may be a wireless connection. For example, the communicative connection between the verification circuit 124 of the receptacle 120 and the electronic controller 128 of the battery 110 may be a Bluetooth connection. In some embodiments, the verification circuit 124 of the receptacle 120 and the electronic controller 128 of the battery 110 may include radio transmitters/receivers configured to communicate with each other. In some embodiments, the radio transmitters/receivers communicate at frequencies between 2 MHz and 3.5 MHz. In some embodiments, the verification circuit 124 and the electronic controller 128 communicate the same information as described above, but through the radio transmitters/receivers.

Figure 13:
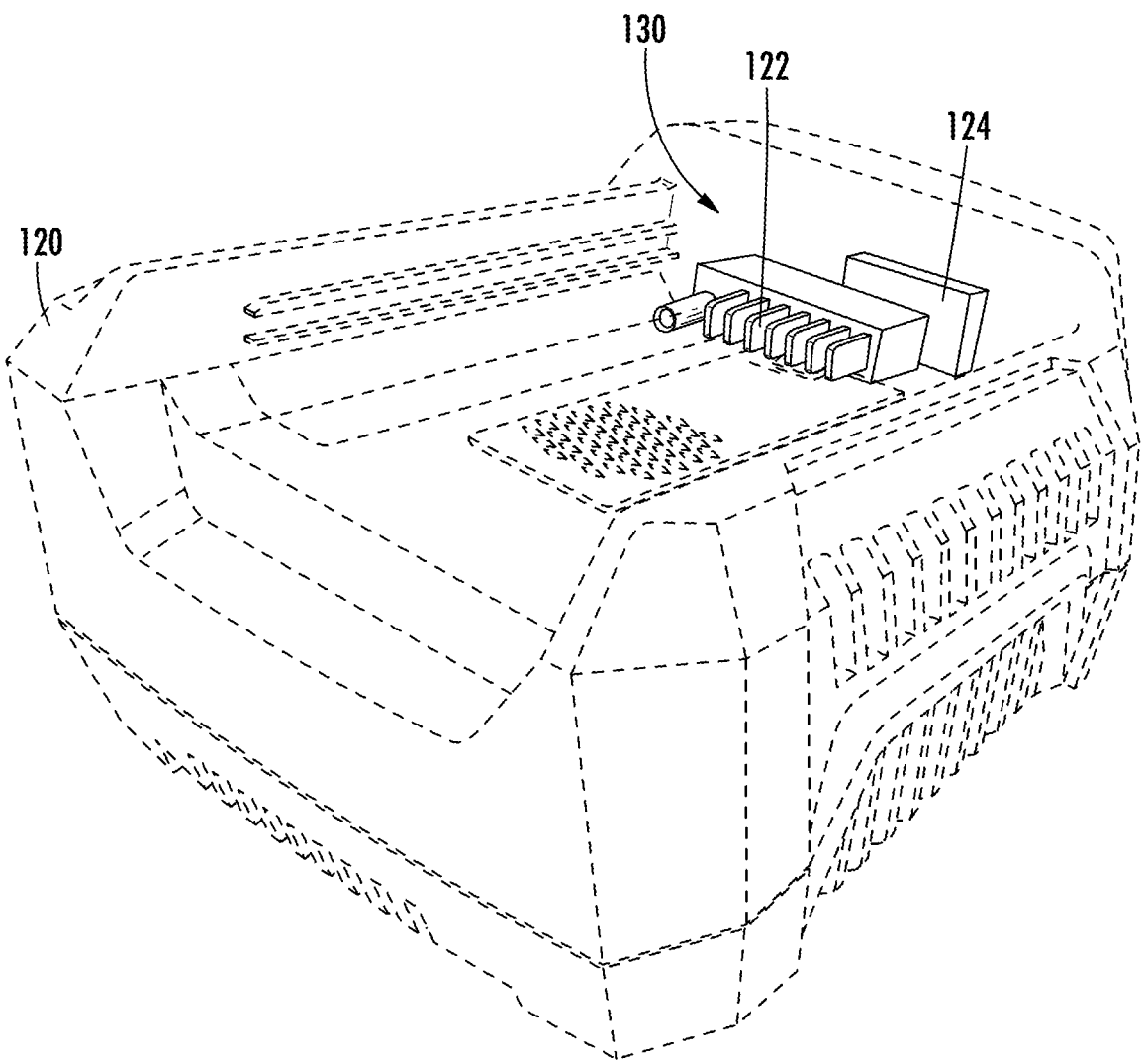
FIG. 13 is a front perspective view of the receptacle of FIG. 1.

Referring now to FIG. 13, the receptacle 120 may include a terminal assembly 130 according to some embodiments. The terminal assembly 130 may include terminals 122 connected to verification circuit 124. Terminal assembly 130 may be removably connected to the receptacle 120 and configured to connect to the battery 110 and communicate with the electronic controller 128 of the battery 110. In some embodiments, the receptacle 120 may include components for removably connecting the battery 110 to the receptacle 120 (e.g., rails, latches, etc.), and the terminal assembly 130 may provide the electrical components for connecting to the battery 110. Advantageously, the terminal assembly 130 may be supplied to other manufacturers so that the terminal assembly 130 can be used in other power equipment. This enables the terminal assembly 130 manufacturer to allow other manufacturers to use the battery 110/terminal assembly 130 system without disclosing the methodology of the system.

Figure 14:
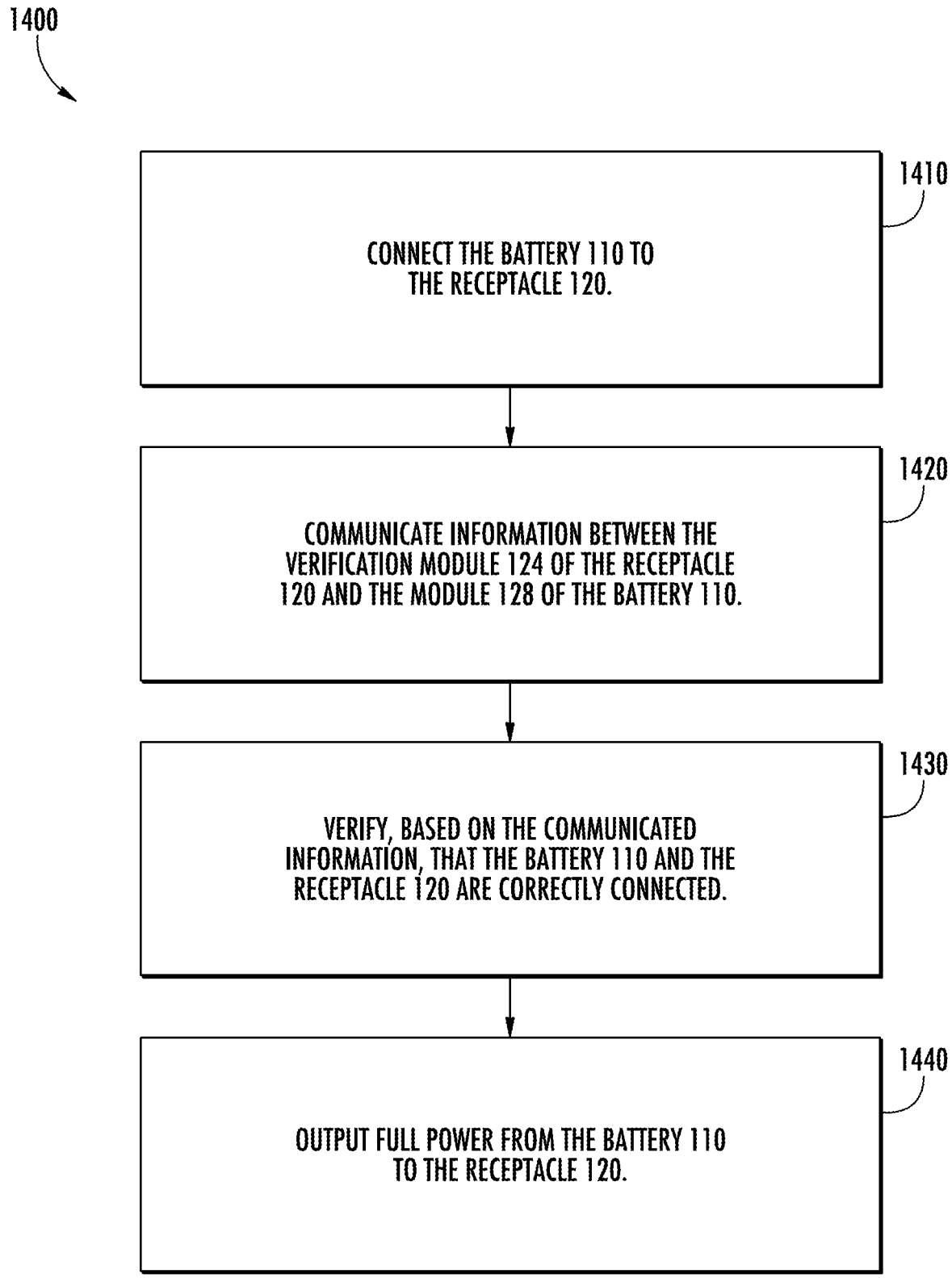
FIG. 14 is a flow diagram of a process of connecting the battery and the receptacle of FIG. 1.

Referring now to FIG. 14, a process 1400 for connecting the battery 110 to the receptacle 120 is depicted, according to some embodiments. Process 1400 includes steps 1410-1440 and details the process of connecting the battery 110 to the receptacle 120 and allowing the battery 110 to output power to the receptacle 120.

Step 1410 of process 1400 includes connecting the battery 110 to the receptacle 120. Step 1410 may be completed by using guide rails 126 of receptacle 120. In some embodiments, guide rails 126 of receptacle 120 are configured to interface with channels 112 of battery 110 to guide the battery 110 to proper connection with the receptacle 120. In some embodiments, receptacle 120 and/or battery 110 may include latches configured to removably connect battery 110 and receptacle 120. Step 1410 also includes electrically and communicably connecting battery 110 and receptacle 120. Battery 110 and receptacle 120 may be electrically connected by connecting terminals 122 of the receptacle 120 to terminals 114 of the battery 110. In some embodiments, one of the sets of terminals 114 and 122 are male and one of the sets of terminals 114 and 122 is female. In some embodiments, the connection between terminals 114 and 122 allows the battery 110 to output power to the receptacle 120 which may then be transferred to equipment. In some embodiments, battery 110 and receptacle 120 are also communicably connected. In some embodiments, electronic controller 128 of battery 110 is communicably connected to verification circuit 124 of receptacle 120 such that verification circuit 124 and electronic controller 128 may communicate information between each other. In some embodiments, the battery 110 and the receptacle 120 are communicably connected through at least one of terminals 114 and 122. In some embodiments, electronic controller 128 and verification circuit 124 are communicably connected to each other through at least one of terminals 114 and 122. In some embodiments, battery 110 and the receptacle are communicably connected through radio transmitters/receivers. In some embodiments, electronic controller 128 and verification circuit 124 are communicably connected to each other through radio transmitters/receivers.

Step 1420 of process 1400 includes communicating information between the verification circuit 124 of the receptacle 120 and electronic controller 128 of the battery 110. In some embodiments, the verification circuit 124 of the receptacle 120 and electronic controller 128 of the battery 110 communicate information between each other through the communicable connection described in step 1410. Step 1420 of process 1400 may be performed by electronic controller 128 and verification circuit 124 according to some embodiments. In some embodiments, electronic controller 128 and verification circuit 124 are circuits configured to communicate with each other digitally. In some embodiments, electronic controller 128 and verification circuit 124 are microprocessors. In some embodiments, electronic controller 128 and verification circuit 124 are configured to communicate with each other serially. In some embodiments, the information sent and received between electronic controller 128 and verification circuit 124 is at least one of a password, a value, a command, or any other information. Information communicated between electronic controller 128 and verification circuit 124 may be encrypted according to some embodiments. In some embodiments, both electronic controller 128 and verification circuit 124 may have a key or algorithm to encrypt and decrypt information sent between them. The key or algorithm may be stored in the memory of electronic controller 128 and verification circuit 124 according to some embodiments. In some embodiments, the key or algorithm is stored in non-volatile memory on the electronic controller 128 or the verification circuit 124. In some embodiments, information sent between electronic controller 128 and verification circuit 124 is analog. For example, verification circuit 124 of battery 110 may be configured to detect that a resistor of receptacle 120 has a particular value. In some embodiments, verification circuit 124 of receptacle 120 may detect that battery 110 has a resistor with a particular value and send a command to electronic controller 128 of battery 110 based on detecting that the resistor has the particular value.

Step 1430 of process 1400 includes verifying, based on the communicated information, that the battery 110 and the receptacle 120 are correctly connected. Additionally, step 1430 may include verifying that the battery 110 is the proper voltage, brand, etc., for the receptacle 120. Step 1430 of process 1400 may be performed by battery 110 and receptacle 120 according to some embodiments. In some embodiments, step 1430 of process 1400 may be performed by verification circuit 124 of receptacle 120 and electronic controller 128 of battery 110. The information communicated between battery 110 and receptacle 120 may indicate that the battery 110 and the receptacle 120 are correctly connected. Additionally, the information communicated between battery 110 and the receptacle may indicate that the battery 110 and the receptacle 120 are compatible with each other. For example, if the electronic controller 128 of the battery 110 communicates the correct password to the verification circuit 124 of the receptacle 120 (or if the verification circuit 124 of the receptacle 120 communicates the correct password to the electronic controller 128 of battery 110 to "unlock" battery 110), this may verify that the battery 110 and the receptacle 120 are compatible with each other. In some embodiments, the information transmitted between battery 110 and receptacle 120 or between electronic controller 128 of battery 110 and verification circuit 124 of receptacle 120 may be a command, a value, or any other information as described in step 1420 above.

Step 1440 of process 1400 includes outputting full power from the battery 110 to the receptacle 120. In some embodiments, step 1440 is performed by electronic controller 128 of battery 110. Electronic controller 128 of battery 110 may be configured to control the power output from the battery 110 based on the information communicated between battery 110 and receptacle 120 or based on information communicated between electronic controller 128 of battery 110 and verification circuit 124 of receptacle 120. In some embodiments, the power output from the battery 110 is transferred to the receptacle 120 through the connection between terminals 114 and 122. In some embodiments, the electronic controller 128 of the battery 110 is configured to transfer the battery 110 from a "locked" mode (i.e., the battery 110 is not allowed to output full power) to an "unlocked" mode (i.e., the battery 110 is allowed to output full power) based on the verification that the battery 110 and the receptacle 120 are connected. In some embodiments, receptacle 120 is configured to transfer the power supplied from the battery 110 to equipment. In some embodiments, receptacle 120 includes electrical connections between terminals 122 of the receptacle 120 and the equipment. In some embodiments, receptacle 120 is electrically connected to a motor of the equipment.

While not stated in process 1400, the electronic controller 128 of the battery 110 may be configured to transfer the battery 110 into a "locked" mode when the battery 110 is disconnected from the receptacle 120 according to some embodiments. Battery 110 and receptacle 120 may continuously transfer information between battery 110 and receptacle 120 while the battery 110 is being used to power the equipment or to transfer power to the receptacle 120. For example, the battery 110 and receptacle 120 may be communicably connected to continuously communicate information between each other that the battery 110 is currently connected to the receptacle. In some embodiments, when the battery 110 is disconnected from the receptacle 120, the communication between the battery 110 and the receptacle 120 is stopped, and as a result, the battery 110 transfers back into a "locked" mode. In other words, battery 110 may be transferred into an "unlocked" mode due to its connection to the receptacle 120, but may also require a continuous communication between the battery 110 and the receptacle 120 in order to keep the battery 110 in an "unlocked" mode. As soon as the communication between the battery 110 and the receptacle 120 is stopped (e.g., due to the battery 110 being disconnected), the battery 110 may default back to a "locked" mode.

Figure 15:
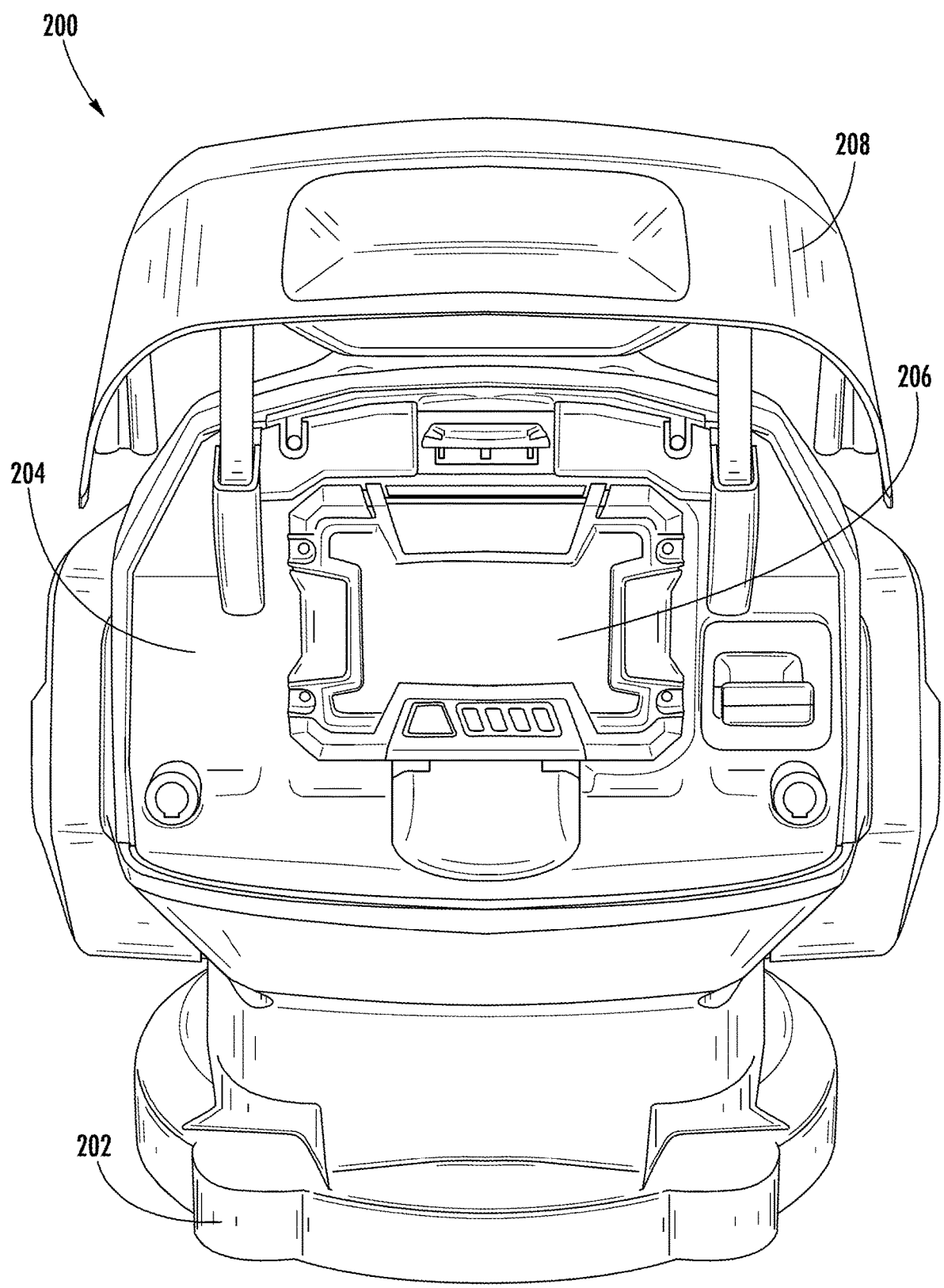
FIG. 15 is a rear view of a lawnmower head assembly including a battery and receptacle assembly.

Referring now to FIG. 15, one implementation of the present invention is shown according to some embodiments. FIG. 15 shows a lawnmower head assembly 200, including a lawnmower head 202, a receptacle 204, a battery 206, and a shield guard 208. Lawnmower head 202 may be fixedly connected to a lawnmower deck (not shown) and may be configured to drive lawnmower blades with a motor (not shown) to cut grass. In some embodiments, battery 206 is configured to slide into a recessed portion of receptacle 204. In some embodiments, receptacle 204 is integrally formed with the lawnmower head 202. Battery 206 may be removably connected to receptacle 204. In some embodiments, shield guard 208 is configured to be selectively configured between an open position (as shown in FIG. 15) and a closed position (not shown). When shield guard 208 is in the closed position, shield guard 208 may provide a surface to maintain the battery 206 in position and to prevent battery 206 from falling out during operation of the lawnmower head assembly 200. Lawnmower head assembly 200 may include a motor (not shown) electrically connected to terminals (not shown) of receptacle 204. In some embodiments, the motor is configured to drive the lawnmower blades.

Battery 206 may include electronic controller 128 and receptacle 204 may include verification circuit 124. In some embodiments, the electronic controller 128 and the verification circuit 124 are configured to communicate as described in detail above. Battery 206 and receptacle 204 may be configured to supply power to the motor based on the communication of the electronic controller 128 and the verification circuit 124 as described in detail above. FIG. 15 is only one implementation of the present invention.

Figure 16:
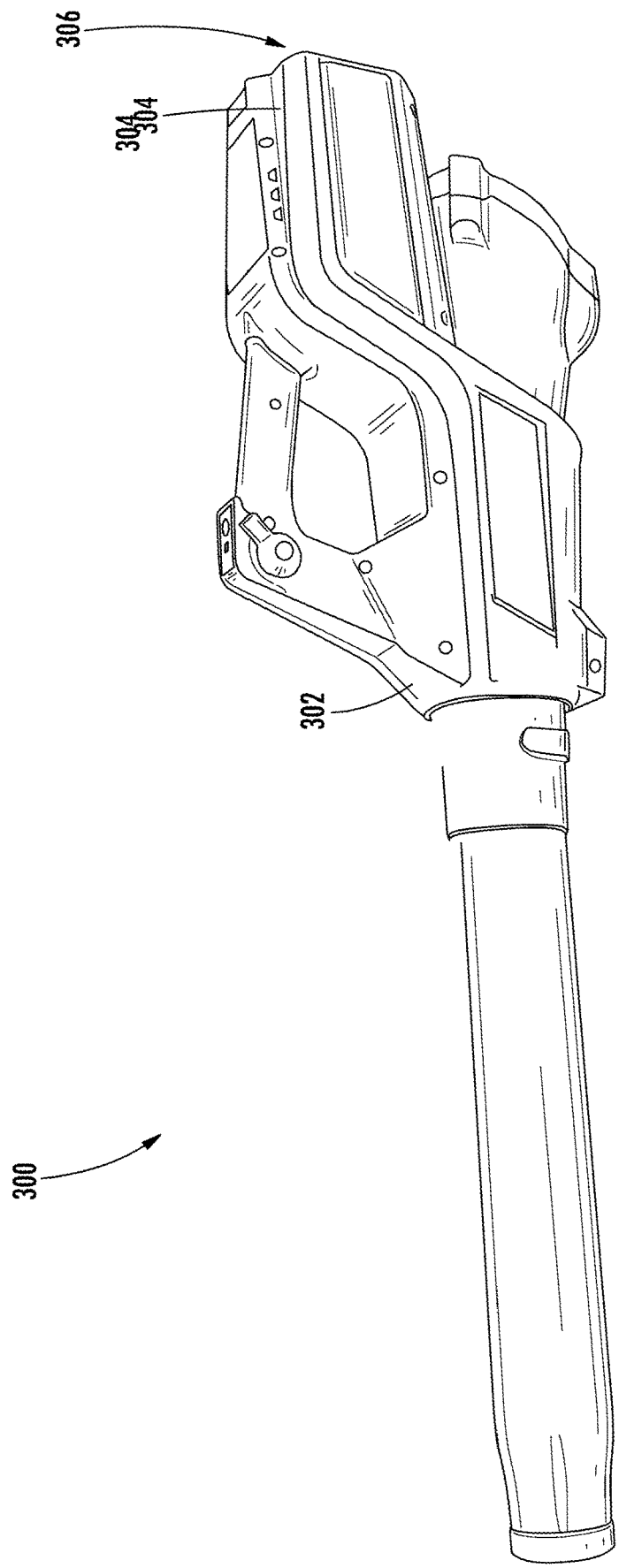
FIG. 16 is a front perspective view of a leaf blower assembly including a battery and receptacle.
Figure 17:
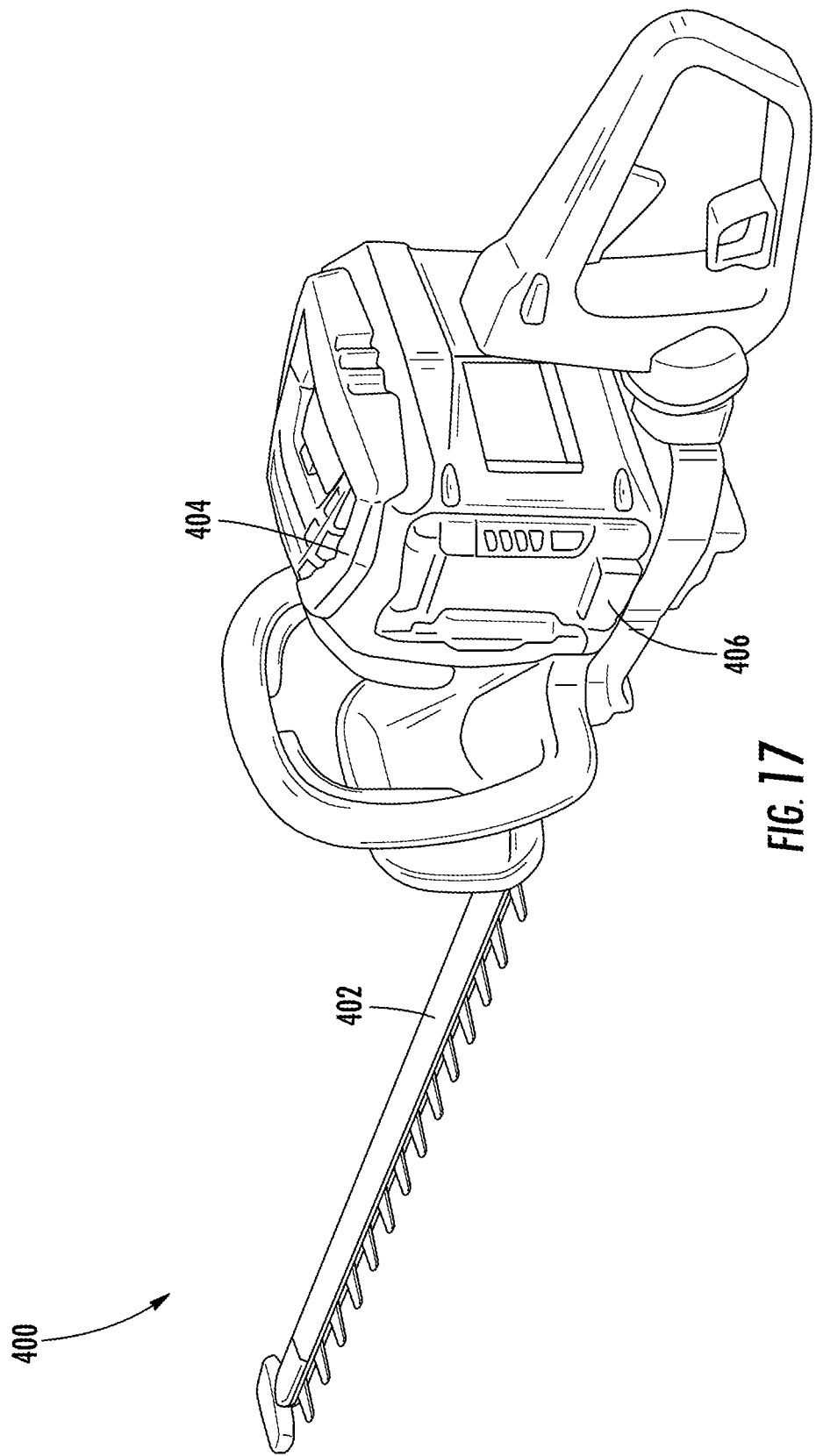
FIG. 17 is a rear perspective view of a trimmer assembly including a battery and a receptacle.
Figure 18:
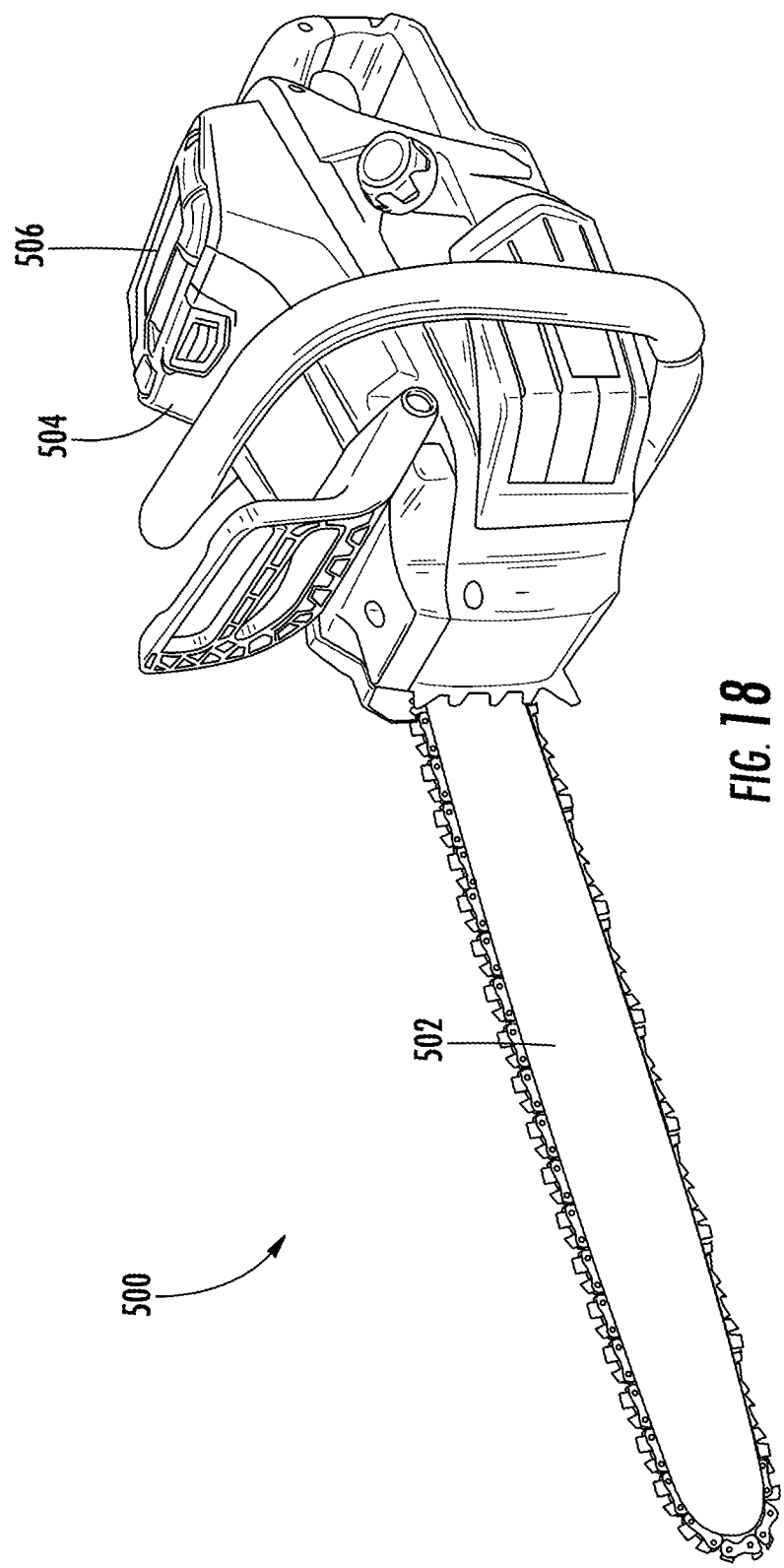
FIG. 18 is a front perspective view of a chainsaw assembly including a battery and a receptacle.

Referring now to FIGS. 16-18, several applications using the battery system described herein are shown. FIG. 16 shows a leaf blower assembly 300, FIG. 17 shows a trimmer assembly 400, and FIG. 18 shows a chainsaw assembly 500. Each of the leaf blower assembly 300, the trimmer assembly 400, and the chainsaw assembly 500 include power equipment (i.e., leaf blower 302, trimmer 402, and chainsaw 502, as shown in FIG. 16, FIG. 17, and FIG. 18, respectively), according to some embodiments. Each of the leaf blower assembly 300, the trimmer assembly 400, and the chainsaw assembly 500, also include batteries 110 and receptacles 120 (i.e., battery 306 and receptacle 304, battery 406 and receptacle 404, battery 506 and receptacle 504, as shown in FIG. 16, FIG. 17, and FIG. 18, respectively). Each of batteries 306, 406, 506 are configured to communicate with and "handshake" with receptacles 304, 404, 504, respectively, as discussed above. In some embodiments, each of receptacle 304, receptacle 404, and receptacle 504 are integrally formed with the housings of leaf blower 302, trimmer 402, and chainsaw 502, respectively. In some embodiments, each of battery 306, battery 406, and battery 506 are configured to deliver power to a motor of the leaf blower 302, trimmer 402, and chainsaw 502, through receptacle 304, receptacle 404, and receptacle 504, respectively.

The battery system described herein is advantageous for several reasons. For example, the battery system provides safety measures to ensure that the battery 110 does not short circuit if a conductive object is accidentally placed across the positive and negative terminals 114. If the battery 110 is shorted, it may cause a sharp increase in temperature which may damage the battery 110. The battery system described herein also reduces the chance that the battery 110 may be damaged by providing a safety mechanism to ensure that the battery cannot output maximum power (or current) when it is not plugged into an appropriate receptacle. Additionally, the battery 110 can still output a small amount of current necessary to measure the voltage of the battery 110 even when the battery 110 is not connected to the receptacle 120.

Another advantage of the battery assembly described herein is it provides the manufacturer greater ability to control the use of its batteries and their application. For example, the manufacturer can provide other manufacturers with terminal assemblies 130, or the terminal 122 and verification circuit 124 components. The other manufacturers can still use the battery 110 and receptacle 120 system on their equipment, however, the battery 110/terminal assembly 130 manufacturer can still maintain control over the use of the battery 110/terminal assembly 130 system. For example, the other manufacturers may produce receptacles 120 integrated into their equipment, and be provided with terminal assembly 130 which may easily be installed in the receptacle 120 and configured to deliver power to the equipment.

Another advantage is that the battery system described herein ensures that the correct battery 110 will be used with the equipment, and that the battery 110 will only output power to the equipment if the battery 110 is appropriately connected to the receptacle 120. Advantageously, this ensures that incorrect batteries with incorrect properties will not be used with the equipment which could damage the equipment or the battery.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery system for power equipment, the battery system comprising:
   a battery configured to removably connect to a receptacle;
   a processing circuit of the battery configured to communicably interface with a processing circuit of the receptacle; and
   a verification circuit configured to communicate with the processing circuit of the battery and enable the battery to transition into an unlocked mode, wherein the verification circuit is within the receptacle, and wherein the receptacle is separate from and connectable to a housing of the power equipment;
   wherein the battery and the receptacle are configured to electrically connect and transfer power from the battery through the receptacle;
   wherein the processing circuits of the battery and the receptacle are configured to transfer information between the battery and the receptacle;
   wherein the processing circuits of the battery and the receptacle are configured to allow the transfer of power from the battery through the receptacle based on the information transferred between the battery and the receptacle; and
   wherein the battery transitions between a locked mode and the unlocked mode based on the transfer information, wherein the locked mode comprises preventing the battery from outputting max power and the unlocked mode comprises allowing the battery to output max power.

2. The battery system of claim 1, wherein the processing circuit of the battery and the processing circuit of the receptacle are configured to continuously transfer information between each other during the transfer of power from the battery through the receptacle to the power equipment.

3. The battery system of claim 2, wherein the information transferred between the processing circuits of the battery and the receptacle is analog information indicating that the battery is connected to the receptacle.

4. The battery system of claim 2, wherein the information transferred between the processing circuits of the battery and the receptacle is digital information indicating that the battery is connected to the receptacle.

5. The battery system of claim 4, wherein the digital information is at least one of a value, a password, a command, and a signal.

6. The battery system of claim 5, wherein the digital information is encrypted and the processing circuit of the battery and the processing circuit of the receptacle contain a key to encrypt and decrypt the digital information.

7. The battery system of claim 6, wherein the battery is configured to default back to a locked mode when the battery is removed from the receptacle.

8. A receptacle assembly for power equipment, the receptacle assembly comprising:
   a receptacle housing;
   a plurality of terminals configured to connect to a plurality of terminals of a battery;
   a processing circuit configured to communicate with a processing circuit of the battery; and
   a verification circuit configured to communicate with the processing circuit of the battery and enable the battery to transition into an unlocked mode, wherein the verification circuit is within the receptacle housing, and wherein the receptacle is integrally formed with a housing of the power equipment;
   wherein the processing circuit is further configured to enable the battery to transfer power from the battery to the receptacle upon a receipt of information from the processing circuit of the battery to allow the battery to transfer power from the battery to the receptacle,
   wherein the battery transitions between a locked mode and the unlocked mode based on the information, wherein the locked mode comprises preventing the battery from outputting max power and the unlocked mode comprises allowing the battery to output max power.

9. The receptacle assembly of claim 8, wherein the processing circuit of the receptacle is further configured to continuously communicate with the processing circuit of the battery during the transfer of power from the battery to the receptacle and the continuous communication between the processing circuit of the receptacle and the processing circuit of the battery is necessary for the continued transfer of power from the battery to the receptacle.

10. The receptacle assembly of claim 8, wherein the processing circuit of the receptacle is configured to communicate digitally with the processing circuit of the battery and the information sent by the processing circuit of the receptacle is digital information.

11. The receptacle assembly of claim 10, wherein the digital information is at least one of:
   a password;
   a value;
   a number;
   a command; and
   a request.

12. The receptacle assembly of claim 11, wherein the processing circuit of the receptacle is configured to encrypt the digital information and send the digital information to the processing circuit of the battery.

13. A method for connecting a battery to a receptacle, the method comprising:
   removably connecting the battery to the receptacle, wherein the battery and the receptacle are electrically and communicably connected;
   transferring information between a processing circuit of the battery and a processing circuit of the receptacle;

transferring power from the battery to the receptacle based on the transfer of information between the processing circuit of the battery and the processing circuit of the receptacle;

the processing circuit of the battery communicating with a verification circuit within the receptacle to enable the battery to transition into an unlocked mode; and transitioning the battery between a locked mode and the unlocked mode based on the information, wherein the locked mode comprises preventing the battery from outputting max power and the unlocked mode comprises allowing the battery to output max power.

14. The method of claim 13, further comprising transferring power from the receptacle supplied by the battery to a motor of a power equipment.

15. The method of claim 14, further comprising:

sending digital information regarding the presence of the battery from the processing circuit of the battery to the processing circuit of the receptacle;

receiving and processing the digital information regarding the presence of the battery from the processing circuit of the battery with the processing circuit of the receptacle;

sending digital information from the processing circuit of the receptacle to the processing circuit of the battery to allow the battery to supply the receptacle with power; and processing the digital information sent from the processing circuit of the receptacle with the processing circuit of the battery and transferring power from the battery to the receptacle.

16. The method of claim 15, further comprising continuously transferring information between the processing circuit of the receptacle and the processing circuit of the battery to maintain the power transfer from the battery to the receptacle.

* * * * *